United States Patent
Svagin et al.

(10) Patent No.: US 8,951,437 B2
(45) Date of Patent: Feb. 10, 2015

(54) CONNECTED HEAT CONDUCTING STRUCTURES IN SOLID AMMONIA STORAGE SYSTEMS

(75) Inventors: Jakob Svagin, Frederiksberg (DK); Ulrich J. Quaade, Bagsvaerd (DK); Johnny Johansen, Copenhagen (DK); Henrik Wagner-Pedersen, Humlebaek (DK); Tue Johannessen, Glostrup (DK)

(73) Assignee: Amminex Emissions Technology A/S, Soborg (DE)

( * ) Notice: Subject to any disclaimer, the term of this patent is extended or adjusted under 35 U.S.C. 154(b) by 881 days.

(21) Appl. No.: 12/570,426

(22) Filed: Sep. 30, 2009

(65) Prior Publication Data

US 2011/0073806 A1    Mar. 31, 2011

(51) Int. Cl.

| | |
|---|---|
| *C09K 3/00* | (2006.01) |
| *B01J 20/02* | (2006.01) |
| *B01J 20/30* | (2006.01) |
| *C01F 11/00* | (2006.01) |
| *B01J 20/04* | (2006.01) |
| *B01J 20/28* | (2006.01) |
| *C01C 1/00* | (2006.01) |
| *C01F 5/00* | (2006.01) |
| *C09K 5/00* | (2006.01) |
| *B01D 53/90* | (2006.01) |
| *B01D 53/94* | (2006.01) |
| *B29C 43/36* | (2006.01) |
| *B29K 105/26* | (2006.01) |

(52) U.S. Cl.
CPC .............. *C01F 11/00* (2013.01); *B01J 20/046* (2013.01); *B01J 20/28011* (2013.01); *B01J 20/28042* (2013.01); *B01J 20/3035* (2013.01); *C01C 1/006* (2013.01); *C01F 5/00* (2013.01); *C09K 5/00* (2013.01); *B01D 53/90* (2013.01); *B01D 53/9409* (2013.01); *B01D 2251/2062* (2013.01); *B29C 2043/3628* (2013.01); *B29K 2105/26* (2013.01)
USPC ............................ 252/193; 502/400; 423/237

(58) Field of Classification Search
USPC ......................................................... 252/193
See application file for complete search history.

(56) References Cited

U.S. PATENT DOCUMENTS 5,441,716 A    8/1995   Rockenfeller

FOREIGN PATENT DOCUMENTS

| CN | 101541401 | 9/2009 |
|---|---|---|
| EP | 1 977 817 | 10/2008 |

(Continued)

OTHER PUBLICATIONS

"Thermophit GFG" product sheet, accessed from http://www.sglgroup.com/cms/_common/downloads/products/product-groups/nm/THERMOPHIT/DB_THERMOPHIT_GFG_e.pdf on Jan. 27, 2014.*

(Continued)

*Primary Examiner* — Peter F Godenschwager
(74) *Attorney, Agent, or Firm* — Frost Brown Todd LLC (57) ABSTRACT

A compacted block of material constructed of one or more units consisting of matter comprising an ammonia-saturated material capable of reversibly desorbing and ad- or absorbing ammonia surrounded by a gas-permeable, flexible material having a thermal conductivity of at least five times the thermal conductivity of said ammonia-saturated material at −70° C. to 250° C. and methods for producing the same are described.

17 Claims, 5 Drawing Sheets

(56) References Cited

FOREIGN PATENT DOCUMENTS

| WO | WO 2006/012903 | 2/2006 |
|---|---|---|
| WO | WO 2008/077652 | 7/2008 |

OTHER PUBLICATIONS

Groll, M.: "Reaction beds for dry sorption machines"—Heat Recovery Systems & CHP., vol. 13, No. 4, 1993, pp. 341-346.

Wang, K., et al.: "Effective thermal conductivity of expanded graphite_$CaCl_2$ composite absorbent for chemical adsorption chillers", Energy Conversion and Management, vol. 47, No. 13-14, Aug. 1, 2006, pp. 1902-1912.

Han, J.H., et al.: "Transformation Analysis of Thermochemical Reactor Based on Thennophysical Properties of Graphite_$MnCl_2$ Complex", Ind Eng Chem Res, vol. 39, 2000, pp. 4127-4139.

Chinese Office Action dated Aug. 27, 2013 for Application No. CN 201080043729.7 with English Translation.

Abstract and English Machine Translation of Chinese Patent No. CN 101541401.

\* cited by examiner

CONNECTED HEAT CONDUCTING STRUCTURES IN SOLID AMMONIA STORAGE SYSTEMS

FIELD OF THE INVENTION

The invention relates to a compacted block of material constructed of one or more units consisting of matter comprising an ammonia-saturated material surrounded by gas-permeable, flexible heat conducting material and a method for producing it.

BACKGROUND OF THE INVENTION

Ammonia is a widely used chemical with many applications. Specific applications include using ammonia as reductant for selective catalytic reduction (SCR) of $NO_x$ in exhaust gas from combustion processes or using ammonia as fuel in energy generating processes as for example in relation to fuel cells.

For most applications, and in particular in automotive applications, the storage of ammonia in the form of a pressurized liquid in a vessel is too hazardous. Urea is a safe, but an indirect and impractical method for mobile transport of ammonia since it requires urea to be transformed into ammonia by a process involving thermolysis and hydrolysis $((NH_2)_2 CO + H_2O \rightarrow 2 NH_3 + CO_2)$.

A storage method involving ad- or absorption in a solid can circumvent the safety hazard of anhydrous liquid ammonia and the decomposition of a starting material.

Metal ammine salts are ammonia absorbing and desorbing materials, which can be used as solid storage media for ammonia (see, e.g. WO 2006/012903 A2), which in turn, as mentioned above, may be used as the reductant in selective catalytic reduction to reduce $NO_x$ emissions.

Ammonia release from the ammonia storage materials is an endothermic process that requires supply of heat. An associated problem is that the storage materials and especially the ammonia depleted storage materials in general have low thermal conductivity and upon depleting ammonia from the material porosities may form, which inhibit heat conduction even more. The effects of deteriorating heat conduction are that the heating source has to be heated to higher temperature and the response time of the system becomes longer.

Another problem arises from material properties changing upon depletion of ammonia from the ammonia storage materials. Because ammonia is a substantial part of the structure of the materials, most ammonia-absorbing solids shrink in overall dimensions upon depletion. If the material initially completely fills a container, it will loose contact with the container walls after degassing. The gap between the container wall and the storage material will act as an insulation layer and prevent heat being transported into the storage material if the container is heated from the outside. It is also undesirable to have a large block of material loosely contained in a container which is mounted on a moving and vibrating vehicle, as this may compromise the mechanical stability of the system.

The present invention addresses these problems.

SUMMARY OF THE INVENTION

In a first aspect, the invention relates to a compacted block of material constructed of one or more units consisting of matter comprising an ammonia-saturated material capable of reversibly ad- or absorbing and desorbing ammonia surrounded by a gas-permeable, flexible material having a thermal conductivity of at least five times the thermal conductivity of said ammonia-saturated material at −70° C. to 250° C.

In a second aspect, the invention relates to a method of producing the compacted block of material comprising:
wrapping said matter comprising an ammonia-saturated material capable of reversibly ad- or absorbing and desorbing ammonia into a gas-permeable, flexible material having a thermal conductivity of at least five times the thermal conductivity of said ammonia-saturated material at −70° C. to 250° C. so that one or more units of wrapped matter are provided,
and compressing said one or more units by an external pressure of at least 5 MPa, wherein optionally said one or more units are placed in a container or mold having one or two open ends and optionally one or more removable walls and said external pressure is exerted uni-axial through the open end(s), optionally via a plate.

In a third aspect the invention relates to a method of producing the compacted block of material of any of claims 1, 2 and 5 to 13 comprising:
wrapping matter comprising an ammonia-depleted material capable of reversibly ad- or absorbing and desorbing ammonia into a gas-permeable, flexible material having a thermal conductivity of at least five times the thermal conductivity of said ammonia-saturated material at −70° C. to 250° C. so that one or more units of wrapped matter are provided,
filling the one or more units into a container, such that the unit(s) are immobilized in the container, and
saturating the ammonia-depleted material capable of reversibly ad- or absorbing and desorbing ammonia with ammonia.

DESCRIPTION OF THE EMBODIMENTS

The present invention solves the above-mentioned problems by enclosing the ammonia storage material capable of reversibly ad- or absorbing and desorbing ammonia inside one or more enclosures. The enclosure consists of a heat conducting material that is permeable for gas transport but not for the storage material. The enclosures acts as heat transfer structures parallel to the enclosure surface. The enclosures are packed or compacted to leave vanishing or substantially no void or interstices between adjacent enclosures. In this way the enclosures are connected to neighboring enclosures through a large area giving almost no heat flow resistance between neighboring enclosures. In effect a heat conducting structure consisting of a fully connected set of closed surfaces with maximum heat transfer capability is obtained.

Thus, in one aspect the invention relates to a compacted block of material constructed of one or more units consisting of matter comprising an ammonia-saturated material capable of reversibly ad- or absorbing and desorbing ammonia surrounded by a gas-permeable, flexible material having a thermal conductivity of at least five times the thermal conductivity of said ammonia-saturated material at −70° C. to 250° C.

"Compacted block of material", as used herein, means a mass of material having the gross of appearance of a block of any desired shape, such as a cylinder, a cube, an ashlar, a pyramid etc or also a totally irregular shape, which is compacted or compressed. The block consists of one or more units (or "packages"), usually of more than one unit, that can individually be identified since each unit is surrounded by an enclosure or closed surface of "wrapping" material. The material within the enclosure comprises a material capable of ad- or absorbing and desorbing ammonia, in its ammonia-saturated state.

Thus, the material capable of ad- or absorbing ammonia ("ammonia storage material") is physically divided into enclosed compartments within the block. Since the block is compacted or compressed the major part of each enclosure is in contact with a neighboring enclosure. The voids or interstices between the enclosures of the packages, i.e. the interfaces between the enclosures, are reduced to a minimum. The contacting surface areas act as a heat transfer area, and the thermal contact resistance vanishes as long as the thickness of the enclosures is small compared to the size of the enclosures. As a result, the enclosures form a completely interconnected set of closed surfaces that act as a heat transfer structure between any two parts of the block.

The large contact area between neighboring enclosures, which is a result of the compaction or compression, furthermore leads to mechanical stability of the overall structure or block that is robust vis-à-vis the mechanical deformations of the ammonia storage material upon desorption or degassing of ammonia.

When there are several units present in the block, there may be an outer enclosure heat conducting gas-permeable, flexible material as defined above surrounding all units.

The number of units or packages, and thus of the enclosures, as well as the size and shape of the units or packages, and thus of enclosures, and the material of the enclosures may vary widely, even within one specific compacted block. Because the block has been compacted or compressed, the resulting final shape of the units and enclosures is not uniform, but will, depending on the initial package shape and exact position of the packages before compressing vary stochastically. However, since the ratio of ammonia storage material to enclosure material is well defined on the package scale, the statistical variations are small particularly when the starting sizes of the packages are similar. Therefore, on length scales larger than the package size the mean values of composition and thermal behavior are well defined. Therefore, there is no need in the production process, as described hereinafter to have detailed control of the material positions.

Although not being limited thereto, a typical dimension of the starting units or packages will be about 1 cm to about 10 cm in diameter, preferably about 5 cm to about 10 cm for use in a container or cartridge having a diameter of from about 10 cm to about 30 cm, and about 2 cm to about 6 cm for a use in a container or cartridge smaller than 10 cm in diameter.

The flexible material surrounding the matter comprising the ammonia storage material, usually some kind of foil or film, is gas-permeable, but dust-tight (i.e. impermeable for the ammonia storage material). The gas permeability is necessary to ensure gas passage from the ammonia storage material when the latter is desorbed or degassed. The property of dust-tightness prevents that the ammonia storage material enters the initial voids and interstices between the packages and any container walls, if present, during the manufacturing process which otherwise would result in a greatly increased thermal contact resistance and decreased mechanical strength of the final block structure. Furthermore, a loss of ammonia storage material and ammonia is reduced during processing.

The necessary gas permeability and dust tightness can be achieved by using a porous foil or film, by perforating the foil or film before forming the packages, by using a foil or film which will become gas-permeable, e.g. porous or perforated, during the compression procedure or simply by closing the packages in a non-hermetical manner. For example, a standard non-permeable foil that is simply wrapped around the ammonia storage material in an overlapping manner to form a package usually has sufficient leak in the enclosure of the package for an ammonia gas transport out of the package but without allowing powder to escape. By gas-permeable the possibility of ammonia gas transport out of the packages by any of the above mentioned mechanisms or any other suitable mechanism leading to the same performance is meant.

The thickness of the foil or film is not critical, as long as it is small compared to the dimension of the whole unit or package. In general, the thickness may vary from about 1 μm to about 100 μm, preferably from about 10 μm and to about 50 μm.

Any material that can be made flexible and gas-permeable and has a thermal conductivity of at least five times, preferably ten times, the thermal conductivity of the ammonia-saturated storage material at −70° C. to 250° C. may be used in the present invention. Exemplary materials are metal, metal alloys, graphite, composite materials, e.g. plastics that has been modified to be heat conductive, rubber that has been modified to be heat conductive, and any mixtures thereof. Preferably, the materials have good mechanical strength and are inert towards ammonia. Presently particularly preferred materials are aluminum and aluminum alloys.

The heat conductive gas-permeable, flexible material usually comprises at least 0.1 mass % and not more than 20 mass % of the mass of the compacted block.

If the compacted block is contained in a container, the heat conductive gas-permeable, flexible material usually comprises at least 0.1 vol. % and not more than 10 vol. % of the container volume.

The number of enclosures, the enclosure sizes and shapes and the thermal conductivity and thickness of the enclosures all affect the overall thermal performance of the compacted block. For two blocks having the same amount and type of enclosure material and ammonia storage material, but different numbers of enclosures, the enclosure sizes and surface areas will, of course, be different. The smaller the number of units and enclosures the larger is the size of the units and enclosures, and the average distance between enclosure surfaces and ammonia storage material having poor heat conductivity will be larger. For specific applications, the above-mentioned parameters are usually optimized to give the desired overall thermal conductivity and thermal response time.

The above-described heat conductive gas-permeable, flexible material serves as an enclosure of matter that comprises an ammonia-saturated material capable of reversibly desorbing and ad- or absorbing ammonia ("ammonia storage material").

Examples of materials capable of reversibly desorbing and adsorbing ammonia are ammonia-saturated acid-treated carbon and zeolites.

Examples of materials capable of reversibly desorbing and absorbing ammonia are metal ammine complex salts. Preferred metal ammine complex salts are of the formula $M_a(NH_3)_nX_z$, wherein M is one or more cations selected from alkali metals such as Li, Na, K or Cs, alkaline earth metals such as Mg, Ca, Sr or Ba, and/or transition metals such as V, Cr, Mn, Fe, Co, Ni, Cu, or Zn or combinations thereof, such as NaAl, KAl, $K_2Zn$, CsCu, or $K_2Fe$; X is one or more anions selected from fluoride, chloride, bromide, iodide, nitrate, thiocyanate, sulphate, molybdate, and phosphate ions; a is the number of cations per salt molecule; z is the number of anions per salt molecule; and n is the coordination number of 2 to 12, preferably 6 to 8.

$Mg(NH_3)_6Cl_2$, $Ca(NH_3)_8Cl_2$, $Mn(NH_3)_6Cl_2$ and $Sr(NH_3)_8Cl_2$ and any mixture thereof are particularly preferred.

Metal ammine complex salts are formed from the plain ammonia-free starting salt by a variety of methods well-known to the person skilled in the art, such as saturation of the plain starting salt in an atmosphere of ammonia e.g. in a container or rotating drum or by treating the plain starting salt with liquid ammonia.

In the context of the present invention "ammonia-saturated" means material capable of reversibly ad- or absorbing and desorbing ammonia wherein most or sometimes virtually all of the sites in the material that can be occupied by ammonia are occupied thereby. In most cases a stoichiometrically complete saturation is difficult or impossible to achieve and that therefore the term "ammonia-saturated" includes the highest degree of saturation that can reasonably achieved practically but does not correspond to the stoichiometric full saturation.

If the ammonia-saturated material consists of one or more of the above-described ammonia-saturated metal ammine salts, its is preferred that the compacted block of material has been compacted such that the density of the ammonia-saturated metal ammine salt(s) is at least 70% of the maximum density thereof. By "maximum density" that density is meant, which the saturated metal ammine salt would have, if it were a single crystal at ambient temperature and pressure. More preferred is a density f at least 75%, or 80%, or 8%, or 90%, or 93%, or 95% or 97% even more than 97%.

The matter which is surrounded by the heat conductive gas-permeable flexible material, besides comprising the ammonia-saturated storage material, may also comprise additives, such as binders, but in particular heat conducting particles and coherent heat conducting structures. The heat conducting particles (e.g. flakes, pellets etc.) and coherent structures (such as small grids etc.) may be made of the same materials as the above-mentioned materials that may be made gas-permeable and flexible.

If there is present only one unit, as defined above, this "primary" unit, besides "unpackaged" material capable of ad- or absorbing ammonia and possible additives and/or coherent heat conducing structures, usually contains smaller secondary units or packages which are otherwise identical to the ones defined above. However, such secondary units may also be enclosed, when more than one of the above-identified primary units or packages are present.

The compacted blocks have been compressed by means of such a pressure or force that they reach a degree of compaction where the voids and interstices of the non-compacted starting assembly of packages or units have disappeared to a large extend. Often the starting assembly is compacted to the maximum degree where it cannot be compressed any further.

Although the pressure applied to cause the voids and interstices of the starting assembly to disappear varies with the nature of the ammonia-saturated material, a minimum pressure is often 5, or more, such as, 10, 20, 50, 100 or even 200 MPa or more.

The compacted block of material of the present invention may be self-supporting, i.e. keep its shape even when it is not enclosed in an outer container. In this case, the compaction can be achieved e.g. by applying pressure from all sides of the starting assembly of the units. More usually, the starting assembly of the compacted block of material is introduced into some kind of container, e.g. a cylinder mead of steel, having one open end or two opposite open ends and which can withstand high pressures and then uni-axially compressed, often via one or two plates placed onto the starting assembly. Optionally, the wall of the container can be removed so as to take out the compacted block of material.

The self-supporting block of material may then be introduced into a container which optionally can be heated in order to release ammonia from the ammonia-saturated material. The heating of the container may be external or internal. In the former case, the container is preferably heat conducting, e.g. made of a material such as aluminum, steel or other metal alloys having a high thermal conductivity. However, it is also possible to use vacuum to release the ammonia or a combination of heat and vacuum.

Alternatively, the starting assembly can be placed into the final container from which the ammonia is released which optionally which has at least one and usually just one open end and can be heated in the same way as mentioned above. However, in this case the container must be able to withstand the pressure required to compact the material or it is placed into a mould with sufficient strength to mechanically support the container during pressing. The starting assembly of the material for forming the compacted block is then uni-axially compacted within this container.

It is preferred that at most 20% of the total enclosure area is perpendicular within ±10° to the desired direction of heat transport, or that at least 80% of the total surface area of said gas-permeable, flexible materials is parallel within ±10° to the desired direction of heat transport.

The desired direction of heat transfer is usually equivalent to the direction of the heat flux if no heat conduction improving structures or additives are present. The heat flux can be found by mathematically (analytically or numerically) solving the heat conduction problem for the given configuration of container and heat supply. For example for a configuration with cylindrical symmetry around an axis, the desired direction of heat transfer is perpendicular to the symmetry axis. For more complex geometries the heat flux in absence of heat conducting structures and hence the desired direction of heat transfer will generally be a function of position. Thus the desired direction of heat transfer in any given point in the container is defined as the direction of the heat flux if no heat transfer improving structures were present.

However, due to the stochastic nature of the connected set of heat conducting surfaces it is not possible to align all the heat conducting material exactly along the desired direction of heat transfer. Thus it is preferred that at least 60% of the heat conducting material is aligned within ±20° to the desired direction of heat transfer. It is more preferred that at least 80% of the heat conducting material is aligned within ±20° to the desired direction of heat transfer. It is even more preferred that at least 80% of the heat conducting material is aligned within ±10° to the desired direction of heat transfer.

Further, due to the stochastic nature of the connected set of heat conducting surfaces it is not necessary to exactly know the desired direction of heat transfer and often it can be approximated by some suitable simple method. For example the desired direction of heat transport at a given point in the container could be approximated by the direction of the shortest line connecting the heating element to said given point.

For a configuration with cylindrical symmetry the approximated direction will be exact. In this case, the desired direction of heat transport is along a radius starting from the longitudinal axis through the center of mass of the compacted block, and, preferably, at most 20° of the total area of the enclosures is perpendicular within ±10° to such radius. This may be achieved e.g. by an oval shape of the starting units or packages and/or by uni-axial compression.

In the case described above, most of the total enclosure surface is parallel to the desired direction of the heat transport. Then the corresponding overall thermal conductivity in the desired direction can be estimated as the weighted average of the thermal conductivities of the enclosure material(s) and the storage material(s).

In an example, in which the enclosure material is aluminum with a thermal conductivity $K_e=240$ W/mK, the ammonia storage material has $k_s=1$ W/mK and the enclosure material comprises 2.5% of the container volume in which it is contained, the estimated overall thermal conductivity is 0.025 $K_e+0.975$ $k_s=7$ W/mK, Preferably, the overall thermal conductivity ranges from 1 W/mK to 20 W/mK.

In a further aspect, the invention relates to a method of producing the compacted block of material as described above comprising:
wrapping said matter comprising an ammonia-saturated material capable of reversibly ad- or absorbing and desorbing ammonia into a gas-permeable, flexible material having a thermal conductivity of at least five times the thermal conductivity of said ammonia-saturated material at −70° C. to 250° C. so that one or more units of wrapped matter are provided,
and compressing said one or more units by an external pressure of at least 5 MPa, wherein, optionally, said one or more units are placed in a container or mold having one or two open end(s) and optionally one or more removable walls and said external pressure is exerted uni-axial through the open end(s), optionally via a plate.

Figure 5:
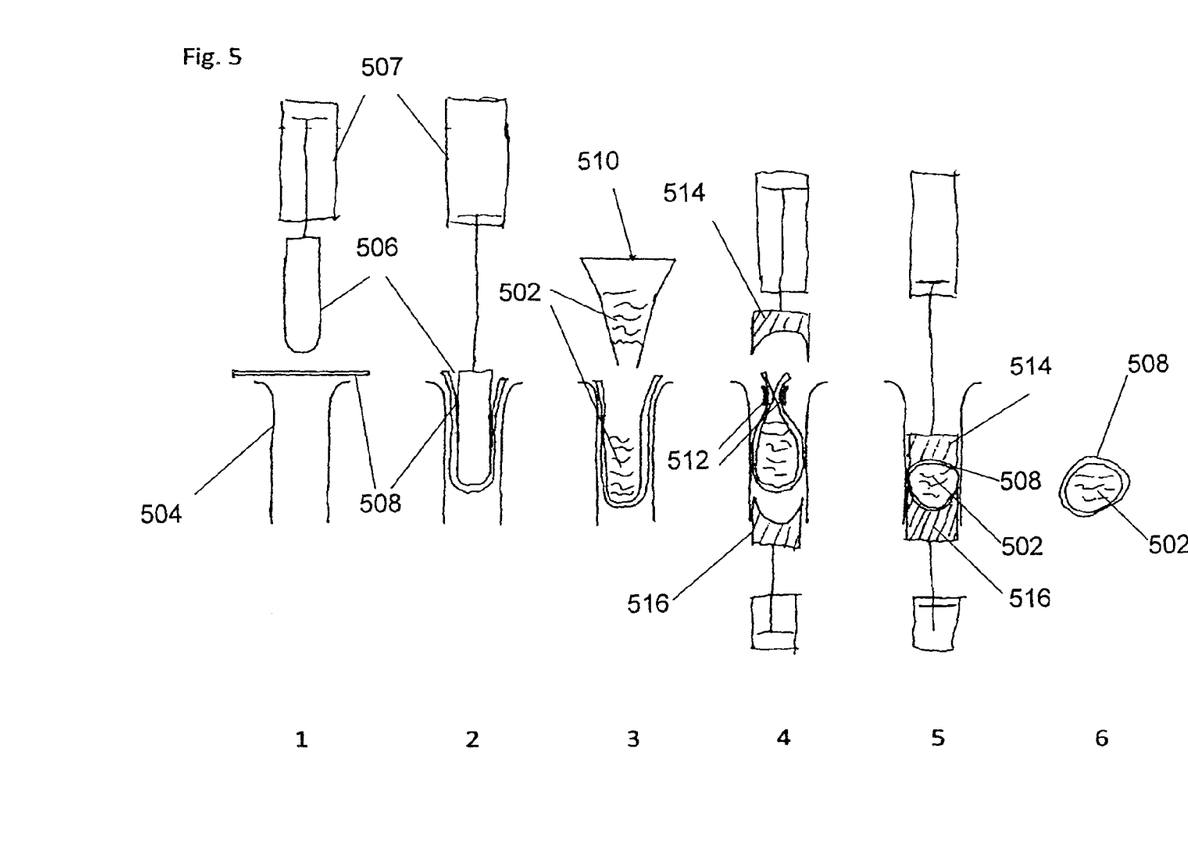
FIG. 5 schematically shows a production line for the ammonia storage material packages wrapped into gas-permeable heat conducting flexible foil.

The wrapping procedure should be fast, robust and reproducible. It is an advantage, if the wrapped packages have a shape that is easy to handle and that packs evenly, when the packages are poured in the container before pressing. Often an almost spherical shape is preferred. It is further an advantage, if the material is pre-compacted in the wrapping process. Preferably, the material is pre-compacted to ⅓ of the final density. Even more preferred is a pre-compaction to ½ of the final density. An example of an automated wrapping sequence is illustrated in FIG. 5. First a piece of aluminum foil is formed into a bowl shape in a shaping tool. Then, the bowl shape is filled with a predetermined amount of ammonia-saturated storage material. Thereafter, the bowl shape is pre-closed by pressing the edges of the bowl shape together. Finally, the package is closed and pre-compacted by pressing with an inverted bowl shaped piston from above and thereafter removed from the packing line. The bowl shape can be varied to give different package shapes, for example a hemispherical shape to produce spherical packages.

Then the material is simply introduced ("poured") into the container in a manner similar to that of introducing bulk or granulated or powder material.

Subsequently, the material is compressed or compacted by means of an external pressure of at least 5 MPa, more preferred at least 10 MPa, e.g. 20 MPa, 50 MPa, 100 MPa, 200 PPa or even more than 200 MPa. The compression may be from all sides of the assembly of wrapped unit(s) or package(s) e.g. in a chamber having suitable movable walls onto which a force may be applied.

More usually, the assembly of wrapped packages is compressed uni-axially, as described above. On this manner it can be achieved that not more than 20° of the total area of the enclosures is perpendicular to the desired direction of heat conductance.

If the ammonia-saturated material consists of one or more of the above-described ammonia-saturated metal ammine salts, its is preferred that it is compacted such that the density of the ammonia-saturated metal ammine salt(s) is at least 70% of the maximum density thereof. By "maximum density" that density is meant, which the saturated metal ammine salt would have, if it were a single crystal at ambient temperature and pressure. More preferred is a density of at least 75%, or 80%, or 8%, or 90%, or 93%, or 95% or 97% even more than 97%.

In a still further aspect the invention relates to a method of producing the compacted block of material in a container, as described above, comprising:
wrapping matter comprising an ammonia-depleted material capable of reversibly ad- or absorbing and desorbing ammonia into a gas-permeable, flexible material having a thermal conductivity of at least five times the thermal conductivity of said ammonia-saturated material at −70° C. to 250° C. so that one or more units of wrapped matter are provided,
filling the one or more units into a container, such that the unit(s) are immobilized in the container, and
treating the ammonia-depleted material capable of reversibly ad- or absorbing and desorbing ammonia with ammonia, thereby saturating and compacting the material capable of reversibly ad- or absorbing and desorbing ammonia.

In this method, the starting matter comprising the ammonia-depleted material, loosely wrapped into the enclosures so as to leave enough space for an expansion of the material.

Ammonia-depleted material capable of reversibly ad- or absorbing and desorbing ammonia means a material wherein the sites that can bind ammonia are occupied only to a small degree (e.g. to a degree of less than 20%) or not at all by ammonia. In the case of metal salts that can form metal ammonia complex salts, the plain metal salts may be utilized as a starting material.

The wrapped material is then placed into a container so that it cannot be move therein (which is usually also achievable by mere "pouring" into the container).

Then ammonia is introduced into the container either in gaseous or in liquid form so as to saturate the material with ammonia. It is well-known to the person skilled in the art that ammonia-depleted storage material expands upon saturation. In the present case, the ammonia storage material, when enclosed in the container, will expand so that voids and interstices between the units or packages and the packages and the wall of the container diminish or disappear and the ammonia storage material in its enclosures will eventually be pressed against the container wall, thus forming a compacted block of material.

In the above case, the amount of ammonia-depleted material filled into the gas-permeable foil is such that after saturation with ammonia the material completely fills the package formed by the foil. This can easily be calculated by means of the weight proportion of plain salt in the saturated salt. For example, $Sr(NH_3)_8Cl_2$ contains 54% $SrCl_2$ by weight, so if a package should contain 100 g of $Sr(NH_3)_8Cl_2$ in the final compressed state, it should be filled with 54 g of $SrCl_8$.

A number of advantages are associated with the present invention including

Good heat transfer from heating source

High heat conduction throughout the storage material

Heat transfer and conduction not (only slightly) dependent on storage material properties (and ammonia content)

Good mechanical and thermal contact to the heating source

Increased mechanical stability of the storage material.

Wrapping storage material in foil will reduce degassing of ammonia during processing     Wrapping storage material in foil will reduce problems with dust during processing     During wrapping process the storage material is pre-compacted     Regular shaped packages results in higher storage material density before pressing     Evenly distributed packages results in higher storage material densities after pressing Those properties make the compacted block of material of the present invention ideally suited for the intended applications where its serves as an ammonia source contained in a container which may be heated and/or be connected to a vacuum line. Such containers are usually connected, usually via suitable dosing devices, with an ammonia consuming unit, such as an SCR catalyst in an exhaust line of a combustion engine, device splitting ammonia into nitrogen and hydrogen or a fuel cell running with ammonia.

Figure 1:
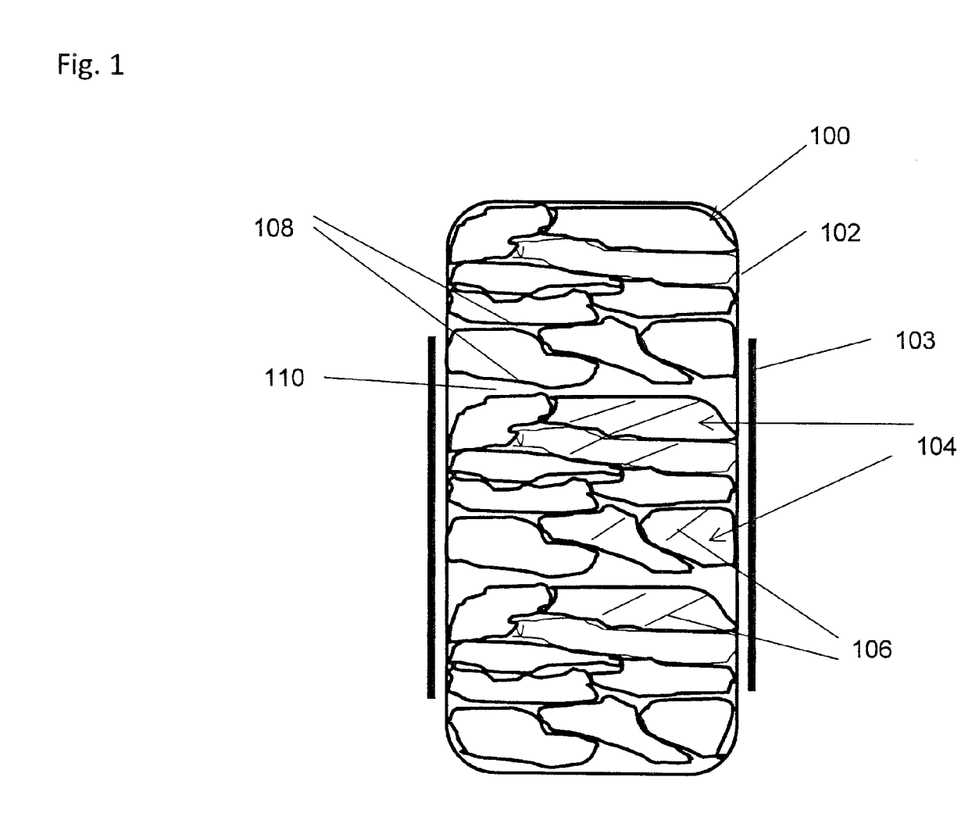
FIG. 1 illustrates an ammonia storage material in a container each portion thereof surrounded by an enclosure of a gas-permeable, flexible, heat conducting material thus forming storage material-containing units or packages the enclosures forming a connected structure of closed surfaces.

FIG. 1 shows a schematic sectional view of a compacted block of material 100 in a container 102 optionally comprising a heating source 103 the compacted block of material 100 being constructed of units or packages 104 containing ammonia saturated storage material 106 wrapped into a heat conducting gas-permeable, flexible material 108. As can be seen, the voids or interstices 110 (grossly exaggerated in the drawing) are minimized and the major part of the surface area of the enclosures 108 is parallel to the desired direction of heat conductance, which is the direction of radii originating from the longitudinal axis through the center of mass of the cylinder shape of the compacted block of material.

Figure 2:
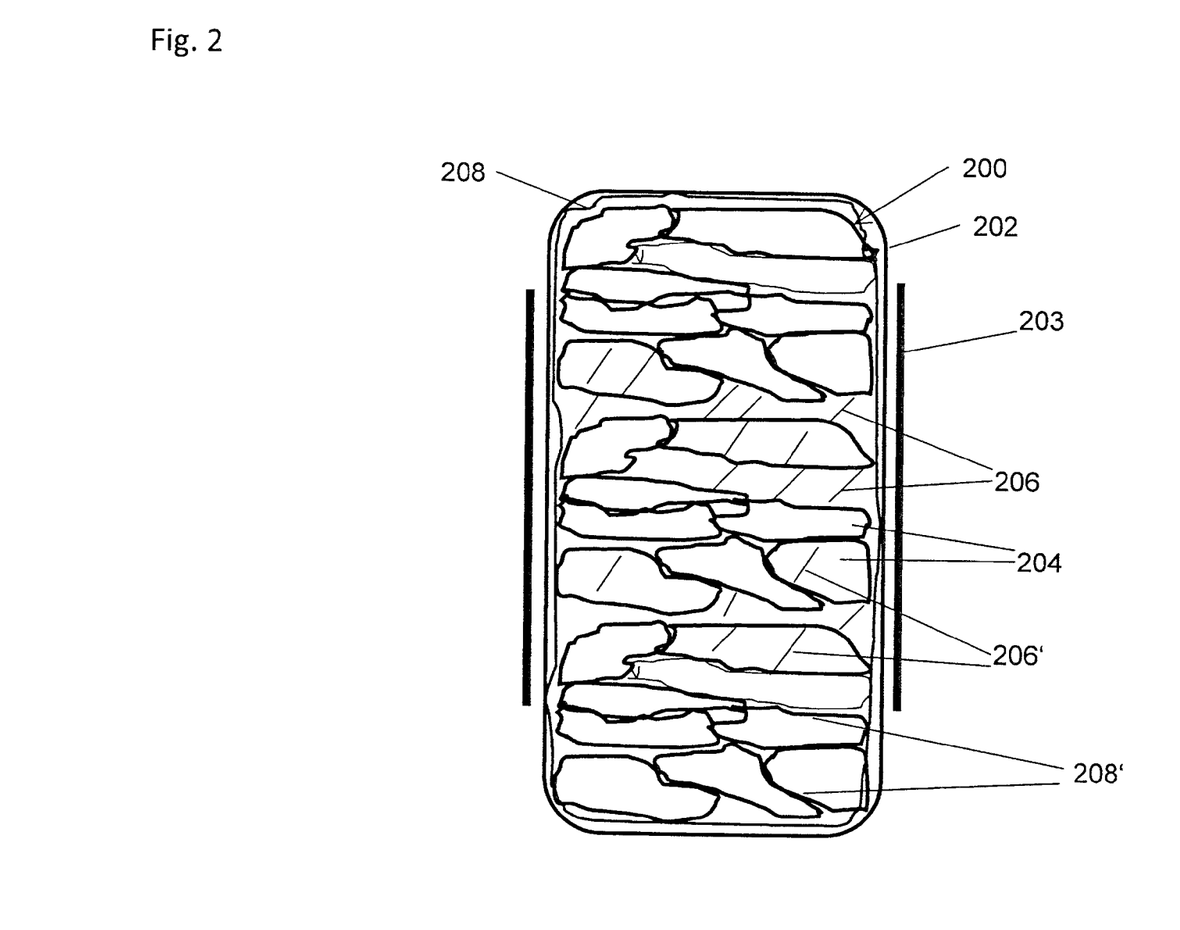
FIG. 2 illustrates an ammonia storage material in a container surrounded by one enclosure of a gas-permeable, flexible, heat conducting material wherein the enclosure, besides the ammonia storage material, encloses secondary storage material-containing units the enclosures of which do not form a completely connected structure of closed surfaces.

FIG. 2 shows a schematic sectional view of a compacted block of material 200 in a container 202 optionally comprising a heating source 203 the compacted block of material 200 being constructed of one unit or package containing ammonia saturated storage material 206 wrapped into a heat conducting gas-permeable, flexible material 208. In addition to the ammonia saturated storage material 206, secondary units or packages 204 filled with further saturated ammonia storage material 206' wrapped into heat conducting gas-permeable flexible material 208' are enclosed in the outer enclosure 208.

Figure 3:
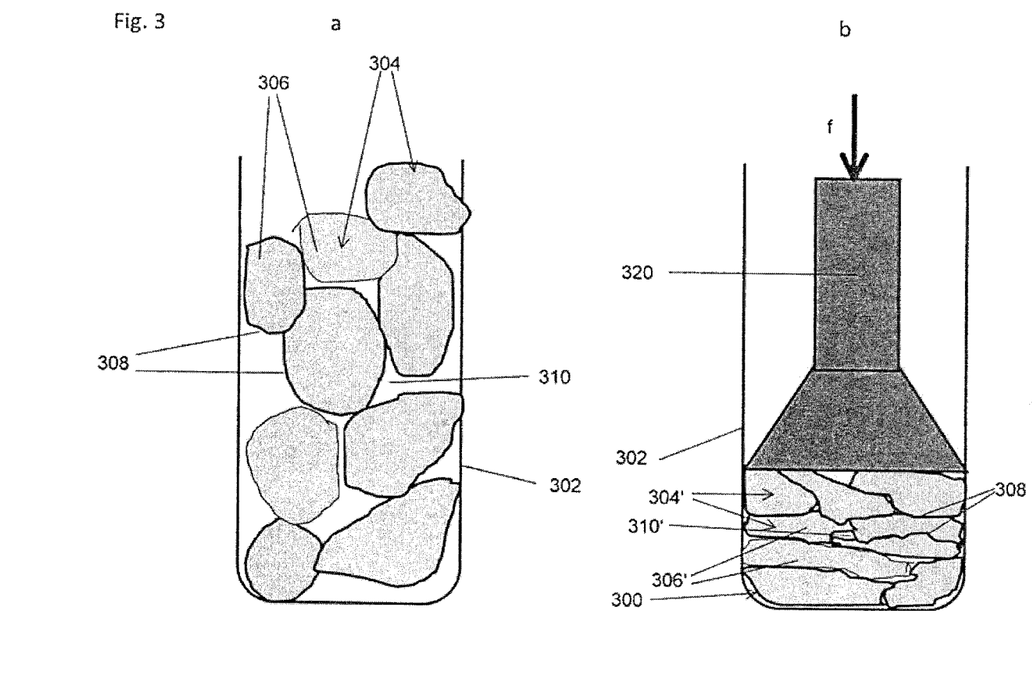
FIG. 3 illustrates a method of forming the structure of FIG. 1 using external force or pressure.

FIG. 3a shows a schematic sectional view of non-compressed starting units 304 containing ammonia saturated storage material 306 wrapped into a heat conducting gas-permeable, flexible material 308 introduced ("poured") in a container 302 with large voids or interstices 310.

FIG. 3b shows the same units after compression by an external force f via a piston 320 wherein the compacted units 304' contain compacted ammonia saturated storage material 306' wrapped into the heat conducting gas-permeable, flexible materials 308 the whole assembly forming a compact mass of material 300 in a container 302 with vanishing voids or interstices 310'.

FIG. 4a shows a schematic sectional view of non-compressed starting units 404 introduced ("poured") in a container 402 with large voids or interstices 410 between them which contain ammonia-depleted storage material 406 wrapped into a heat conducting gas-permeable, flexible material 408

Figure 4:
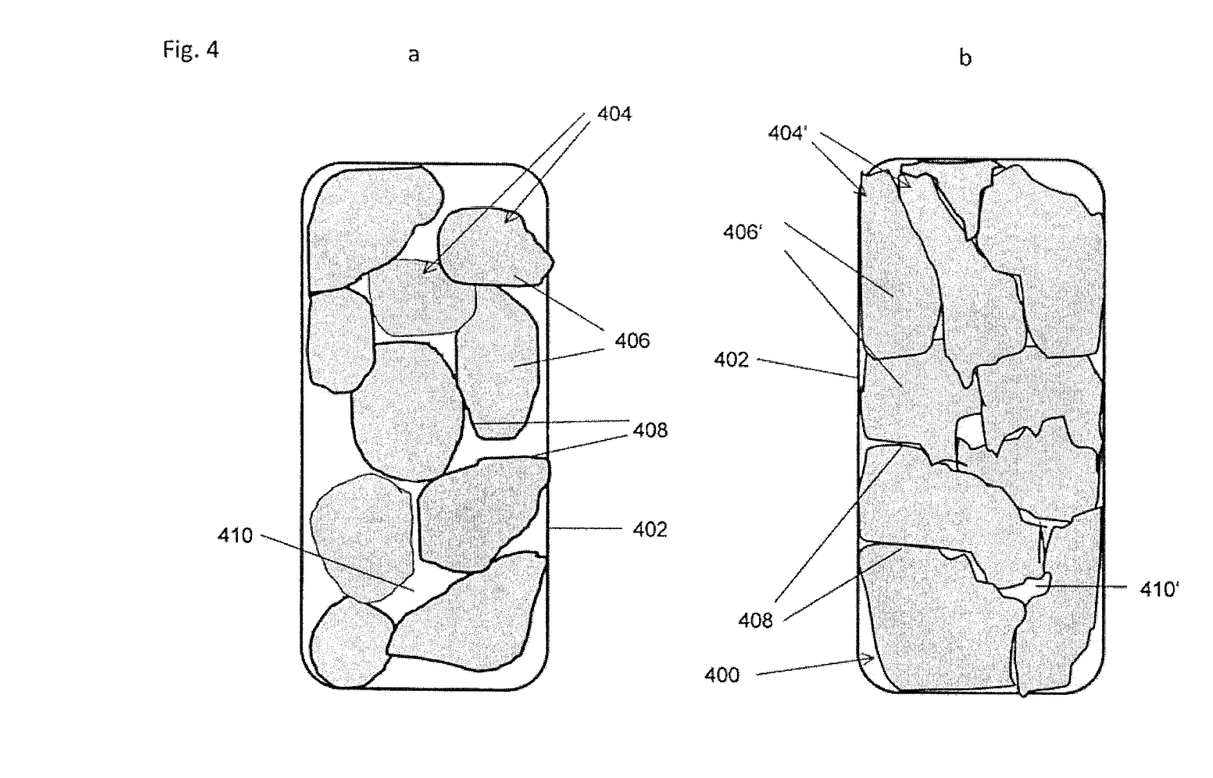
FIG. 4 illustrates a method of forming the structure of FIG. 1 using saturation of the material inside a container.

FIG. 4b shows a schematic sectional view with units 404' which have been expanded by introducing ammonia into the ammonia-depleted storage material 406 of FIG. 4 and compacted thereby so as to contain compacted ammonia saturated storage material 406' wrapped into a heat conducting gas-permeable, flexible material 408 the whole assembly forming a compact mass of material 400 in a container 402 with vanishing voids or interstices 410'.

FIG. 5 shows an example of an automatic packing line for packing ammonia storage material into foil. In step 1, a piece of foil 508 is placed on top of shaping tool 504. In step 2. piston 506 is moved downward by actuator 507 into the shaping tool 504 thereby giving the foil 508 a bowl shape. In step 3 the bowl-shaped foil 508 is filled with a predetermined portion of ammonia storage material 502 from dosage device 510. In step 4 the bowl-shaped foil 508 is pre-closed by a pre-closing instrument 512, and second pistons 514 and 516 are positioned above and below the shaping toll 504. In step 5 the second pistons 514 and 516 are extended, thereby completely closing the foil 508 filled with ammonia storage material 502, which is then removed from the line, as shown in 6.

Example 1

Packages are formed by wrapping 100 g ammonia saturated strontium chloride in aluminum foils weighing 5.1 g with dimensions 50 μm×194 mm×194 mm. 236 packages are pressed into a cylindrical container of stainless steel with diameter 200 mm and volume 18.7 l with a force of $5 \times 10^6$ N. A well connected self-supporting heat conducting structure of closed aluminum surfaces is obtained. The resulting density of the saturated salt was more than 95% of the maximum density obtainable.

Example 2

A container with a volume of 2.24 L is filled with 99 packages each containing 12 g $SrCl_2$ packed in aluminum foil with a thickness of 50 mm and an area of 12.5×12.5 $cm^2$. After saturation the density of the strontium chloride is 1.0 g/ml.

The relevant content of all patents, patent applications and other literature cited herein is hereby incorporated by reference.

The invention claimed is:

1. A compacted block of material constructed of at least one unit comprising matter that comprises an ammonia-saturated material capable of reversibly desorbing and ad- or absorbing ammonia, each of which at least one unit is surrounded by a gas-permeable enclosure made of a flexible material in the form of a film or foil, which forms a completely interconnected set of closed surfaces acting as heat transfer structures and has a thermal conductivity of at least five times the thermal conductivity of said ammonia-saturated material at −70° C. to 250° C.

2. The compacted block of material of claim 1, wherein said one or more units, in addition to said ammonia-saturated material, contain one or more secondary units identical to the units of claim 1 except for being smaller.

3. The compacted block of material of claim 1, which has been compacted by means of a pressure of at least 5 MPa.

4. The compacted block of material of claim 3, wherein said compacted block of material is self-supporting.

5. The compacted block of material of claim 4, wherein said compacted block of material is contained in a container which optionally may be heated.

6. The compacted block of material of claim 5, wherein said gas-permeable enclosure made of a flexible material in the form of a film or foil comprises 0.1 to 20 mass % of the mass of the compacted block.

7. The compacted block of material of claim 1, wherein said compacted block of material is contained in a container which optionally may be heated.

8. The compacted block of material of claim 1, wherein said ammonia-saturated material is selected from a metal ammine complex salt of the formula $M_a(NH_3)_nX_z$, wherein M is one or more cations selected from the group consisting of alkali metals, alkaline earth metals, and transition metals and combinations thereof; X is one or more anions selected from the group consisting of fluoride, chloride, bromide, iodide, nitrate, thiocyanate, sulphate, molybdate, and phosphate ions; a is the number of cations per salt molecule; z is the number of anions per salt molecule; and n is the coordination number of 2 to 12.

9. The compacted block of material of claim 8, wherein the ammonia-saturated material is chosen from $Mg(NH_3)_6Cl_2$, $Ca(NH_3)_8Cl_2$, $Mn(NH_3)_6Cl_2$ and $Sr(NH_3)_8Cl_2$ or any mixture thereof.

10. The compacted block of material of claim 8, which has been compacted to such a degree that the density of the ammonia-saturated material is at least 70% of its maximum density at normal temperature and pressure.

11. The compacted block of material of claim 1, wherein the thermal conductivity of said gas-permeable enclosure made of a flexible material in the form of a film or foil is at least ten times the thermal conductivity of said ammonia-saturated material.

12. The compacted block of material of claim 1, wherein said gas-permeable enclosure made of a flexible material in the form of a film or foil is selected from metal, metal alloys, graphite, composite materials, modified plastics, modified rubber and any mixture thereof.

13. The compacted block of material of claim 12, wherein said gas-permeable enclosure made of a flexible material in the form of a film or foil is selected from aluminum or an aluminium alloy.

14. The compacted block of material of claim 1, wherein the units of the compacted block of material have a shape so that at least 60% of the total surface area of said gas-permeable enclosure made of a flexible material in the form of a film or foil is parallel within ±20° to the desired direction of heat transport.

15. A method of producing the compacted block of material of claim 1 comprising:
wrapping said matter comprising an ammonia-saturated material capable of reversibly ad- or absorbing and desorbing ammonia into a gas-permeable, flexible material having a thermal conductivity of at least five times the thermal conductivity of said ammonia-saturated material at −70° C. to 250° C. so that one or more units of wrapped matter are provided, and compressing said one or more units are placed in a container or mold having one or two opposite open end(s) and optionally one or more removable walls and said external pressure is exerted uni-axial through the open end(s), optionally via a plate.

16. A method of producing the compacted block of material of claim 1 comprising:
wrapping matter comprising an ammonia-depleted material capable of reversibly ad- or absorbing and desorbing ammonia into a gas-permeable, flexible material having a thermal conductivity of at least five times the thermal conductivity of said ammonia-saturated material at −70° C. to 250° C. so that one or more units of wrapped matter are provided,
filling the one or more units into a container, such that the unit(s) are immobilized in the container, and
treating the ammonia-depleted material capable of reversibly ad- or absorbing and desorbing ammonia with ammonia, thereby saturating and compacting the material capable of reversibly ad- or absorbing and desorbing ammonia.

17. The compacted block of material of claim 1, wherein the units of the compacted block of material have a shape so that at least 80% of the total surface area of said gas-permeable enclosure made of a flexible material is parallel within ±10° to the desired direction of heat transport.

* * * * *